(No Model.)
L. P. SMITH.
SAWING MACHINE.
No. 506,948. Patented Oct. 17, 1893.
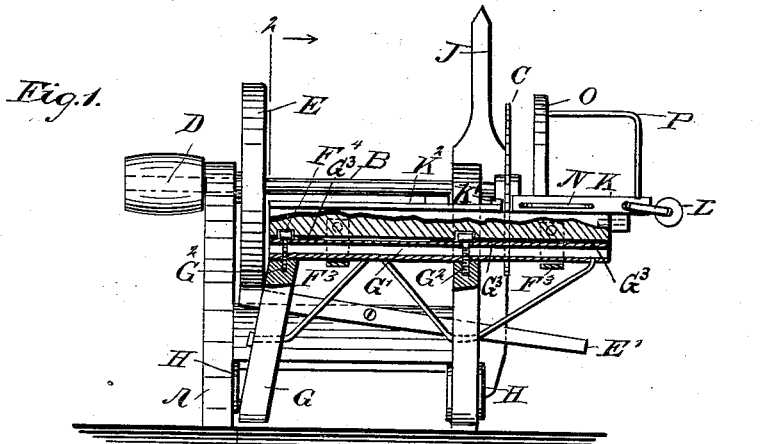
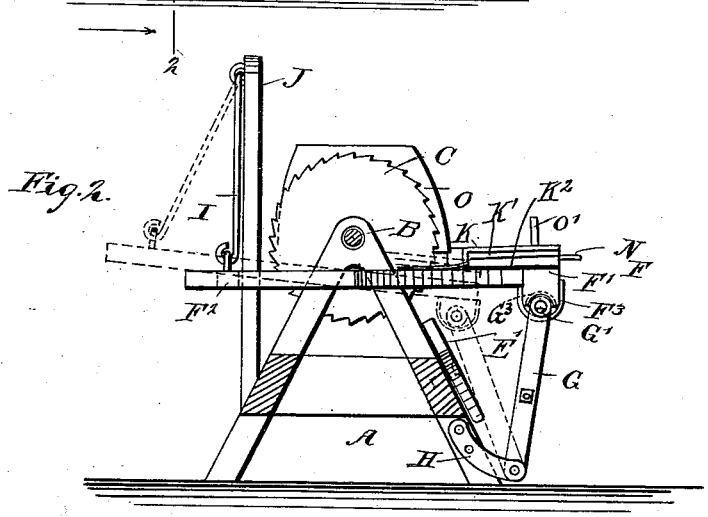
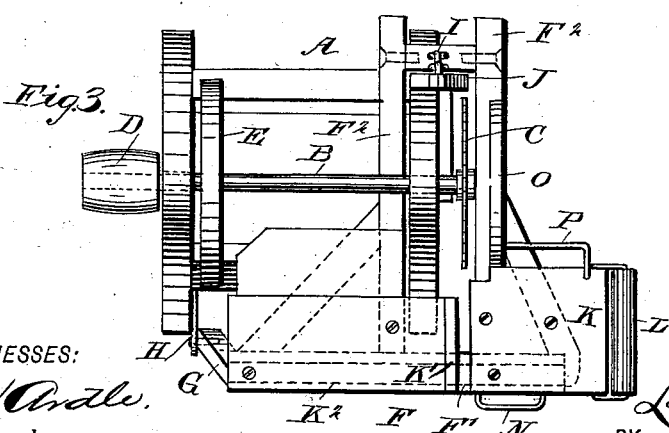
WITNESSES:
INVENTOR
ATTORNEYS.

UNITED STATES PATENT OFFICE.

LESLIE P. SMITH, OF OTEGO, NEW YORK.

SAWING-MACHINE.

SPECIFICATION forming part of Letters Patent No. 506,948, dated October 17, 1893.

Application filed February 2, 1893. Serial No. 460,662. (No model.)

*To all whom it may concern:*

Be it known that I, LESLIE PALMER SMITH, of Otego, in the county of Otsego and State of New York, have invented a new and Improved Sawing-Machine, of which the following is a full, clear, and exact description.

The object of the invention is to provide a new and improved sawing-machine which is simple and durable in construction, and arranged for conveniently supporting the log and moving it to the saw to be cut.

The invention consists of a table supported at its front edge on swinging legs and supported at its rear end on a swinging arm.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a front elevation of the improvement with parts in section. Fig. 2 is a sectional side elevation of the same on the line 2—2 of Fig. 1; and Fig. 3 is a plan view of the same.

The improved sawing machine is provided with a suitably-constructed frame A, in which is journaled the saw spindle B, carrying the circular saw C and a pulley D, connected by belt with other machinery for imparting a rotary motion to the said shaft B and the circular saw. On the shaft B is also arranged a fly wheel E, adapted to be engaged by a brake lever E', under the control of the operator and pivoted to the frame A. The saw table F is arranged below the saw spindle B and is mounted to swing forward and backward, so as to move the log to the saw C, to be cut. In order to permit this motion of the saw table F, I provide the latter with a table frame F', hung at its front edge and at the under side thereof, on legs G pivoted on brackets H, projecting from the lower end of the saw frame A, as plainly shown in the drawings. The pivotal connection between the legs G and the table frame F' is formed by means of a pipe G', held on the upper ends of the legs G and engaging a semi-circular recess in the under side of the frame F', suitable eyes or clips $F^3$ being provided and secured on the table frame to pass around the lower half of the said pipe G', as plainly shown in Fig. 1.

In order to reduce the frictional contact between the pipe G' and table F, I interpose a number of plates $G^3$ between the pipe and table, as shown in Figs. 1 and 2.

The heads of the bolts $G^2$ for securing the pipe in place on the table legs fit into recesses $F^4$ formed on the under side of the table frame F', so as to prevent the latter from sliding sidewise when placing the log on the table or removing it therefrom. The table frame F' is provided with a rearward extension $F^2$, passing below the spindle B and pivotally-connected at its rear end with an arm I hung at its upper end on a post J, secured to the frame A. The post J forms a guide for the extension $F^2$, see Fig. 3, so as to prevent the table from twisting at the extension.

The table top for the frame F' is composed principally of the parts K, K' and $K^2$, of which the part K is the receiving section of the table top, and the part K' forms a slot with the part K for the entrance of the saw C, as plainly shown in Fig. 3. This second part K' is somewhat lower than the part K, and the third part $K^2$ extending to the left from the part K', is also somewhat lower than the part K'. This is for the purpose of preventing the log from binding on the saw when the latter is cutting nearly through the log. On the outer end of the table top part K is journaled a roller L, over which the log is conveniently rolled onto the table top.

In order to protect the circular saw C from the log, I provide a guide O extending on one part of the extension $F^2$ and held in place by suitable braces P, the said guide O being curved upwardly at its front edge to prevent the log from striking the saw, when moving the log onto the table.

On the front edge of the table frame F', directly in front of the table top section K, is arranged a handle N and on top of the said section may be located a pin O', both adapted to be taken hold of by the operator for conveniently swinging the table forward or backward.

The operation is as follows: When the several parts are in the position illustrated in Fig. 2, then the log to be sawed is passed over the roller L onto the table top, the log then resting on the part K. The operator now takes hold of the handle N and pushes the table rearward, the table swinging on the front legs G and on the extension F² hung on the arm I. The log is thus fed against the revolving saw C which thereby cuts the log, the cut-off end sagging, as the cut proceeds onto the part K' and finally on the part K², so that no binding whatever takes place on the saw during the cutting operation. It will be seen that as the table has its top surface located below the saw spindle B, a full cut can be made by the saw in the log, as the center of the saw spindle is approximately in the same horizontal plane as the center of the log. By this arrangement a deeper cut can be made by a certain sized saw than with any arrangement to me known. It will be seen that when the table is moved rearwardly, with the log in place thereon, the said table assumes an inclined position with the front end of the table lower than the rear, as indicated in dotted lines in Fig. 2.

Having thus fully described my invention, I claim as new and desire to secure by Letters Patent—

1. A sawing machine comprising a frame supporting the saw spindle, table legs pivotally-connected with the said saw frame, a saw table pivotally-connected at its frame with the said legs, an arm pivotally-connected with an extension of the said saw frame, the said arm being pivoted on a post erected on the said saw frame, substantially as shown and described.

2. A sawing machine comprising a frame supporting the saw spindle, table legs pivotally connected with the said saw frame, a saw table pivotally-connected at its frame with the said legs, an arm pivotally-connected with an extension of the said saw frame, the said arm being pivoted on a post erected on the said saw frame, the table top of the said table being composed of three parts having their upper surfaces of different height, substantially as shown and described.

3. A sawing machine comprising a frame supporting the saw spindle, table legs pivotally-connected with the said saw frame, a saw table pivotally-connected at its frame with the said legs, an arm pivotally-connected with an extension of the said saw frame, the said arm being pivoted on a post erected on the said saw frame, the table top of the said table being composed of three parts having their upper surfaces of different height, and a guide secured on the said table frame, substantially as shown and described.

4. A sawing machine comprising a frame supporting the saw spindle, table legs pivotally-connected with the said saw frame, a saw table pivotally-connected at its frame with the said legs, an arm pivotally-connected with an extension of the said saw frame, the said arm being pivoted on a post erected on the said saw frame, the table top of the said table being composed of three parts having their upper surfaces of different height, and a handle held on the front of the said table to move the latter transversely, substantially as shown and described.

LESLIE P. SMITH.

Witnesses:
TILLEY BLAKELY,
ARTHUR E. AUSTIN.